Feb. 19, 1957 W. H. ARMACOST ET AL 2,781,746
ART OF GENERATING AND HEATING STEAM
Filed Oct. 17, 1952 11 Sheets-Sheet 10
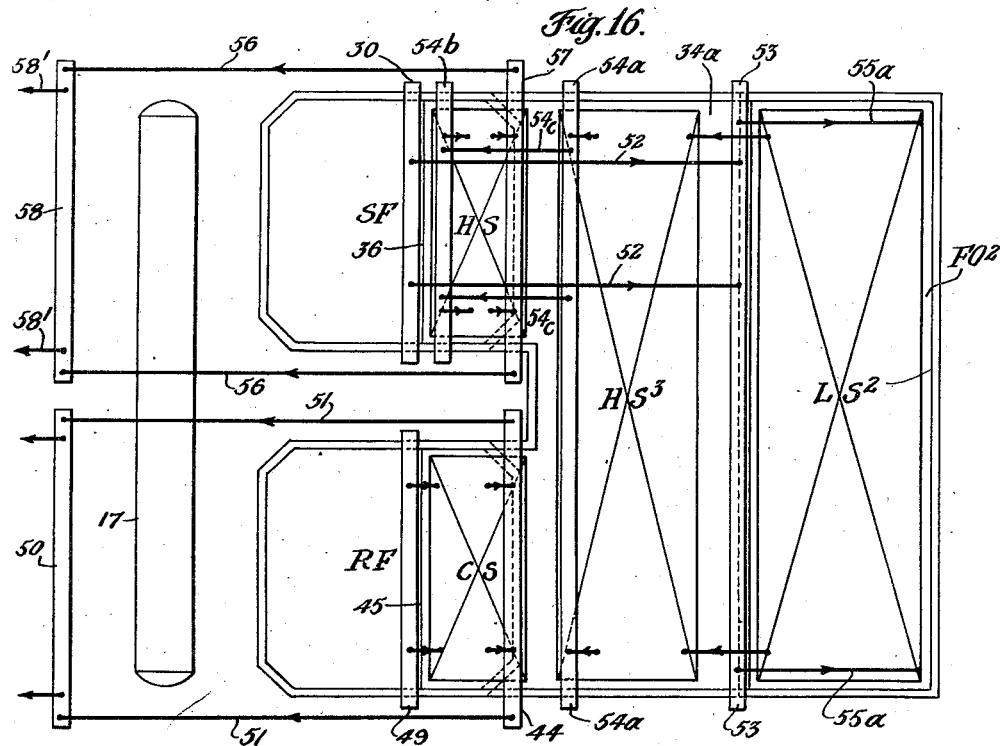
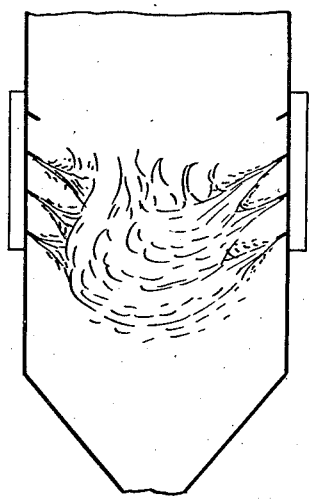
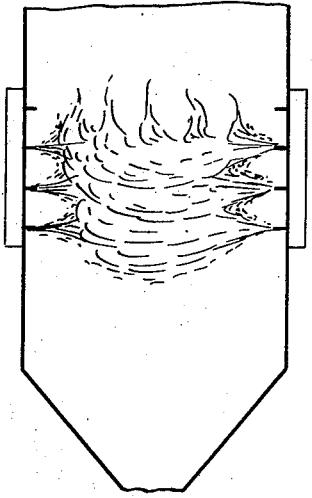
INVENTORS
Wilbur H. Armacost
Leonard J. Marshall
ATTORNEYS

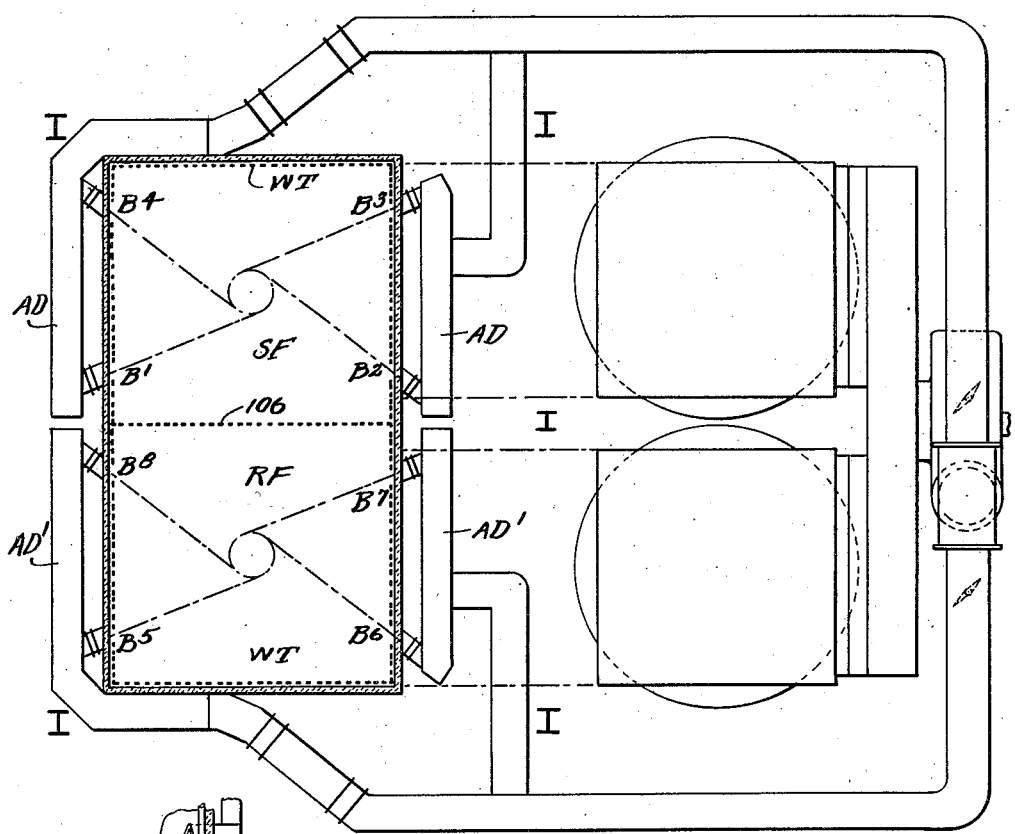
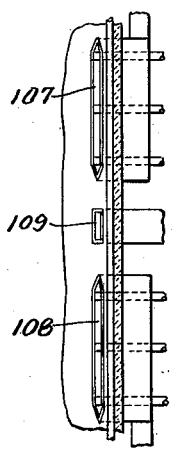

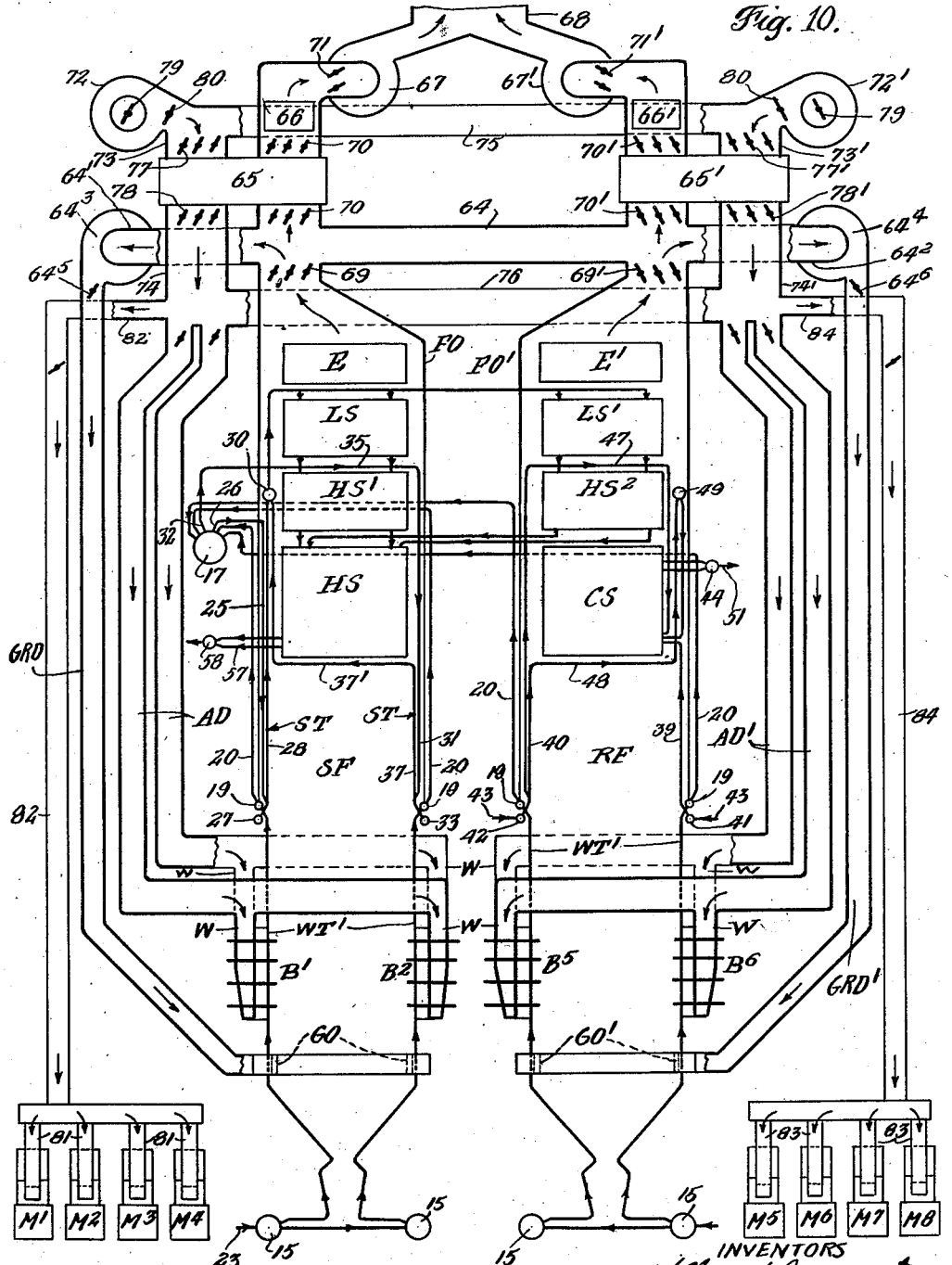

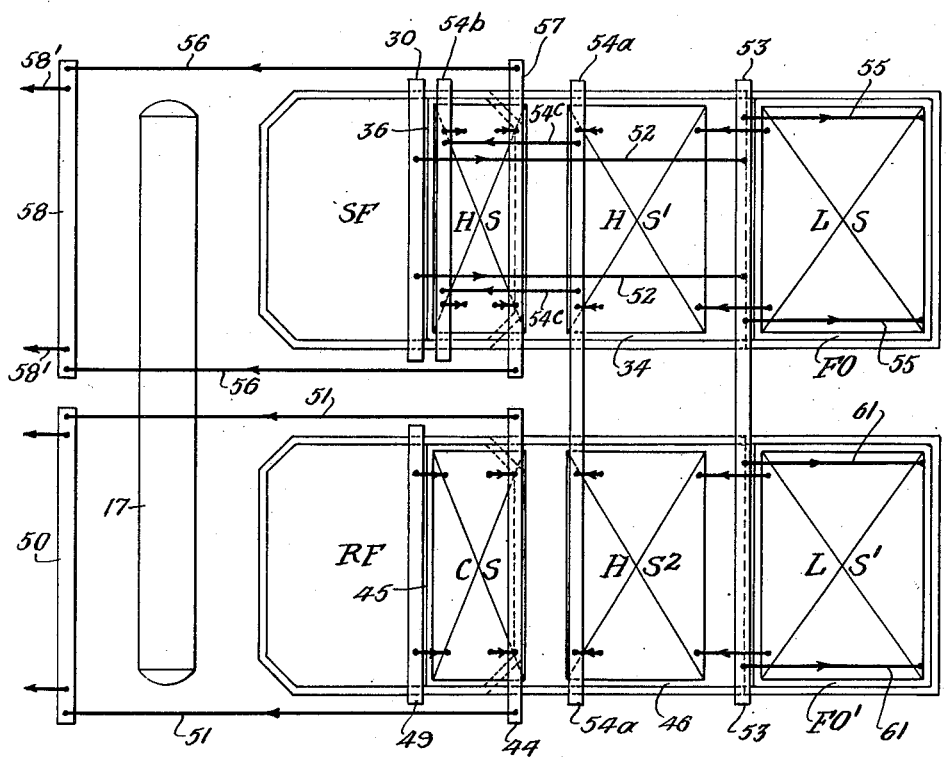

United States Patent Office 2,781,746
Patented Feb. 19, 1957

2,781,746

ART OF GENERATING AND HEATING STEAM

Wilbur H. Armacost, Scarsdale, N. Y., and Leonard J. Marshall, Tenafly, N. J., assignors to Combustion Engineering, Inc., New York, N. Y., a corporation of Delaware Application October 17, 1952, Serial No. 315,228

1 Claim. (Cl. 122—479)

This invention relates to the art of steam generation and steam heating.

High pressure, high capacity steam generating installations, operating at high steam and reheat temperatures, say, for example, installations generating about 1,000,000 lbs. of steam per hour or more at about 1800 or 2000 lbs. pressure or thereabout, with constant steam temperatures of say around 1100° F. of superheat and about 1050° F. to 1100° F. reheat, over a wide range of load, have long been recognized as a desirable objective. The invention will be described in connection with such an installation.

One of the difficulties in realizing the objective has been to do this with a highly efficient heat cycle and with economy, not only as to physical construction, but also as to efficiency of combustion and operation otherwise. Efficiency of heat cycle with or without economy in construction is not sufficient, but these must be realized in a practical way insofar as operating conditions are concerned, such, for example, as difficulties arising in connection with the fuel, with the temperature to which the various parts of the installation are to be subjected, and so on.

The basic fuel is of course coal, and while it may be contemplated as to any particular installation that it may initially burn gas or oil or prepared fuel, the design, for practical considerations, must be such that it is possible to change from one type of fuel to another, including the basic fuel, with only minor changes as to burners and air supply and with no change in the generating and steam heating equipment, as this would involve what in effect would be reconstruction. Coal, for example, may be at one time of high quality and of high melting point ash, or it may again be of poor quality with low melting point ash and therefore present heat transfer difficulties, such as slagging on convection surfaces, if temperature conditions are not kept within certain limits. Again, no matter what the fuel, the maximum temperature to which the various heat transfer surfaces may be subjected is of great importance from the standpoint of economy and long life. Even as to the steam heating surfaces—superheat and reheat—the higher the heat resistant alloy which has to be employed, the higher the cost; likewise nothing is gained from the standpoint of economy in construction if excessive amounts of heating surface for superheaters and reheaters is required to realize the objective or from the standpoint of efficiency the fuel is not effectively burned.

Merely by way of partial illustration, to obtain high capacity with high steam and reheat temperatures, with conventional designs embodying convection superheaters and reheaters, the required furnace outlet temperatures are too high to prevent substantially slag-free operation with coal of even normal quality; the amount of superheat and reheater surfaces are excessive; and there is inability to maintain the temperature of steam heating and reheating constant over a wide range of load—an important consideration from the standpoint of efficiency.

Again, merely by way of partial illustration, there is the factor of the ability to get the installation into initial operation without expansion and contraction difficulties, or overheating of materials, and to get the installation quickly back on the line after banking, without such difficulties. Because of these difficulties (in both the turbine and the installation itself) it ordinarily takes considerable time to get the installation back on the line.

Obviously high capacity installations of the character here involved will be very large. They must be suspended from overhead by supporting structure which constitutes a very substantial portion of the cost of the whole installation. High concentrated foundation loads are to be avoided.

The primary object of the present invention is to provide an installation which realizes the essential objectives hereinbefore mentioned but in an economical way both from the standpoint of physical construction and from the standpoint of efficiency in operation otherwise.

To accomplish this essential objective we provide the described combination of parts, some of which, individually considered, may be old, but all of which cooperate to secure the essential objectives as will hereinafter appear.

More particularly, we provide a unit installation, certain parts of which are separated from others, but nevertheless constitute a unit as contrasted with purley multiple installations. Merely multiplying relatively small installations to obtain the desired total capacity with the desired steam and reheat temperatures, would not realize either the economy of construction nor the efficiency of combustion, nor the overall high efficiency of heat cycle, of the present invention.

Most briefly considered, we burn fuel and generate steam in zones separated from one another and arrange the superheating, reheating, economizer and air preheating surfaces in such a manner as to obtain most effective utilization of the heat generated, with economy in construction and other advantages. The optimum results are obtained, when with the above, forced or controlled circulation, and tilting burners and gas recirculation for steam temperature control are employed, as will further appear.

Moreover, these objectives are realized along with the ability of readily maintaining a constant temperature of superheat and of reheat over a wide range of load say from a maximum point to about 10% of load or rating. Stated in another way, we propose to secure great flexibility of operation through control of temperatures throughout a very large range of operation and this with economy of physical construction and efficiency of operation from all standpoints, including the ability to readily clean surfaces.

The foregoing objectives, together with such other objects and advantages as may hereinafter appear, are illustrated in the accompanying drawings, in which—

Figure 8 is a plan view of a modification of the invention showing a separated furnace employing a dividing wall of water tubes between the superheater and reheater furnaces;

Figure 9 is a fragmentary vertical section showing a modified burner arrangement;

Figure 10 is a block diagram of the installation;

Figure 20:
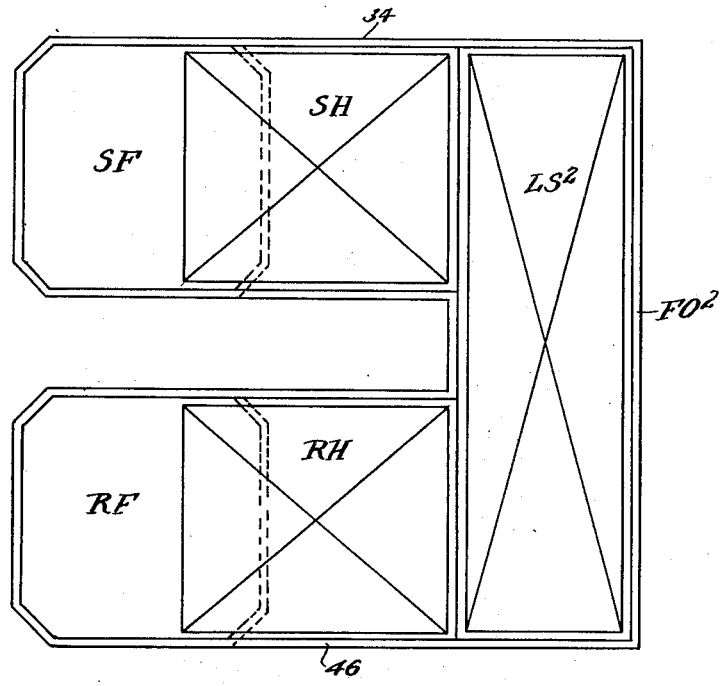
Figure 21:
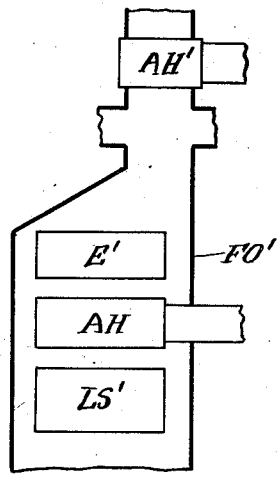

Figures 11 to 14 inclusive are block diagrams of the fuel feed connections to the burners of one of the furnace portions;

Figure 15 is a diagrammatic plan view illustrating certain tube connections of the preferred form of our invention;

Figure 16 is a diagrammatic plan view of a modification in the gas passages and superheater arrangements;

Figures 17, 18 and 19 are diagrammatic views illustrating how the tilting burners may be adjusted;

Figure 20 is a diagrammatic plan view of still another modification of the gas passages and steam heating arrangements, and Figure 21 is a diagrammatic view illustrating a modified arrangement of air preheating surfaces.

Figure 3:
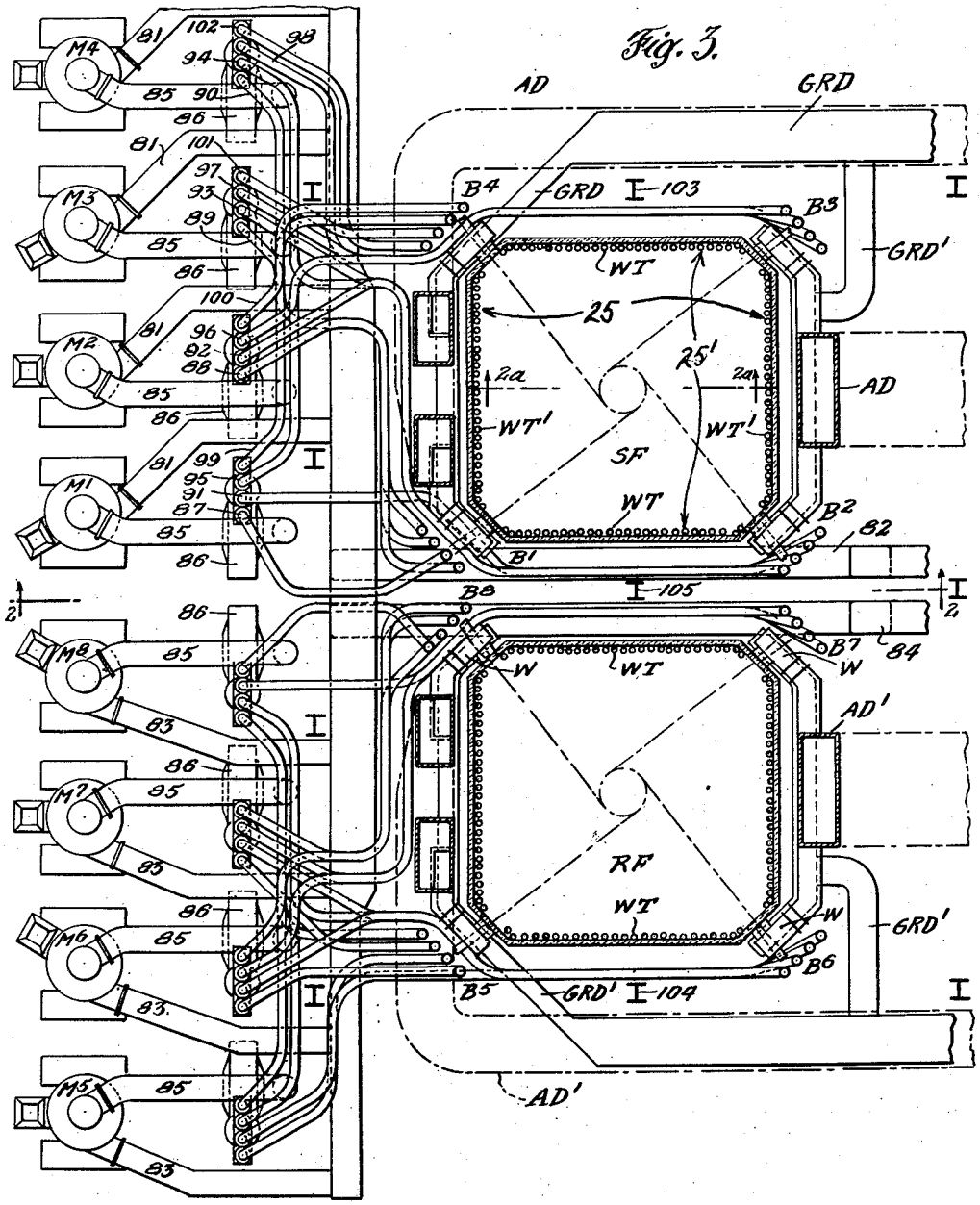
Figure 3 is a plan section of the furnace taken substantially on the line 3—3 of Figure 2 and showing the arrangement of the fuel feed system in plan view.
Figure 4:
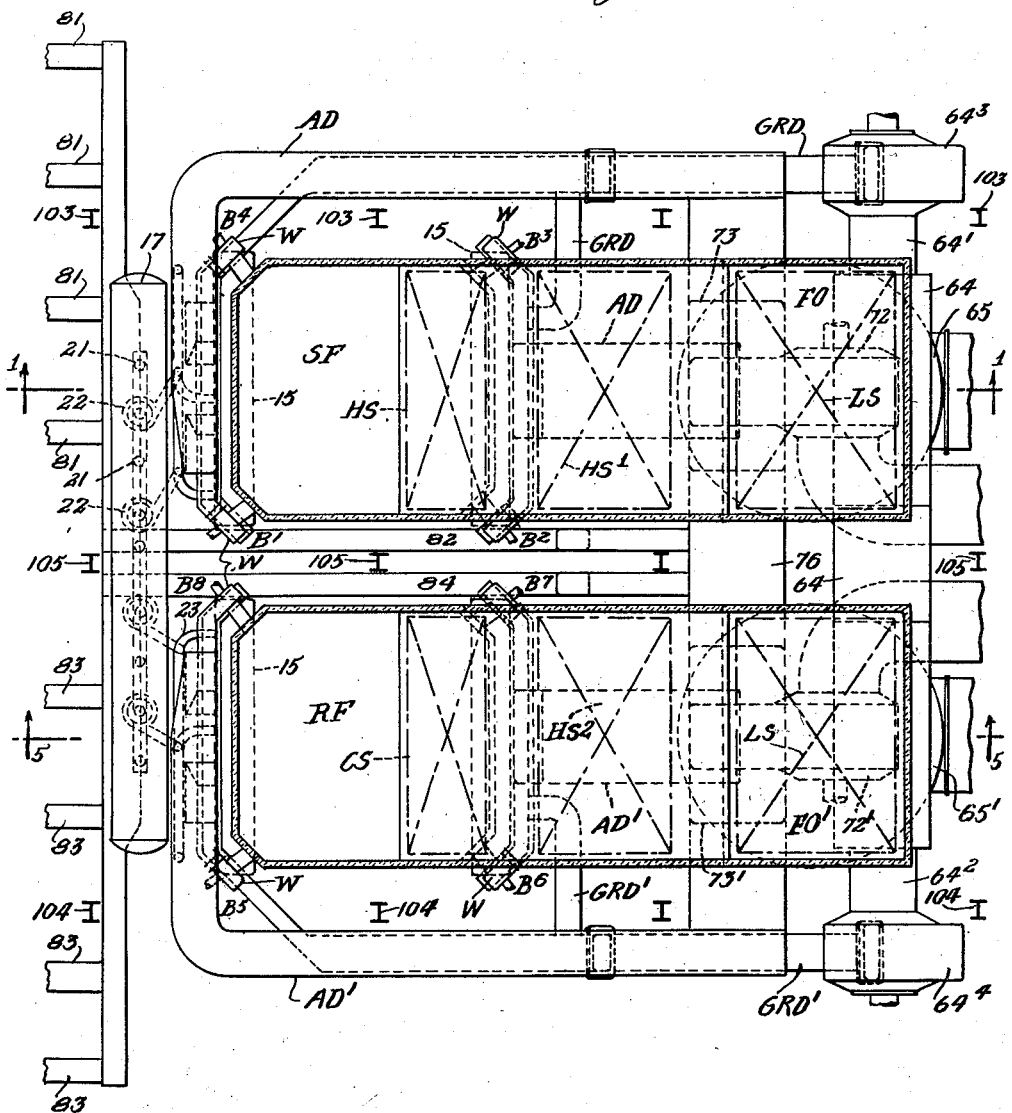
Figure 4 is a plan section taken substantially on the line 4—4 of Figure 1, with the superheater and reheater units indicated diagrammatically.

Referring to Figures 1 to 4 inclusive and Figure 10, and particularly Figures 3 and 4, in general the installation, in its preferred form, comprises a superheater furnace portion SF, a reheater furnace portion RF, fuel burners $B^1$, $B^2$, $B^3$ and $B^4$ for admitting fuel to the superheater furnace portion SF, fuel burners $B^5$, $B^6$, $B^7$ and $B^8$ for admitting fuel to the reheater furnace portion RF, fuel pulverizing mills $M^1$, $M^2$, $M^3$ and $M^4$ from which fuel and primary carrying air is fed to the burners of the superheater furnace portion, fuel pulverizing mills $M^5$, $M^6$, $M^7$ and $M^8$ from which fuel is fed to the burners of the reheater furnace portion, wind boxes W associated with the fuel burners for admitting secondary air which the fuel, air ducts AD, AD' for leading such secondary air to the wind boxes W, and gas recirculation ducts GRD and GRD' leading from the furnace outlet passages FO, $FO^1$ to gas inlet openings GO and $GO^1$ (see Figures 1, 2 and 10) located in the vicinity of the fuel burners through which the recirculated gas is introduced into the furnace.

Figure 1:
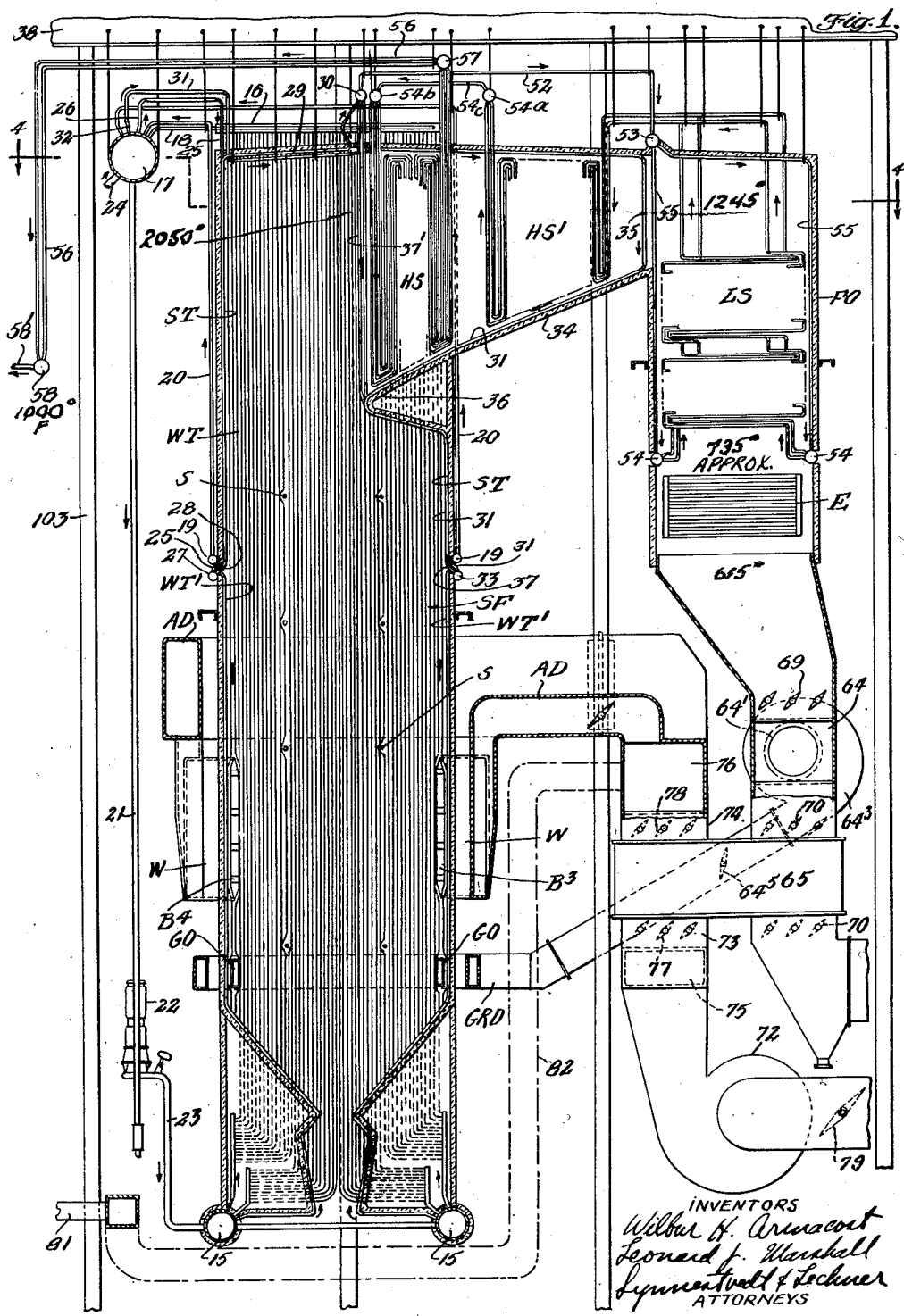
Figure 1 is a sectional elevational view through the superheater portion of the installation, the section being taken substantially on the line 1—1 of Figure 4 and certain parts being diagrammatically illustrated.
Figure 2:
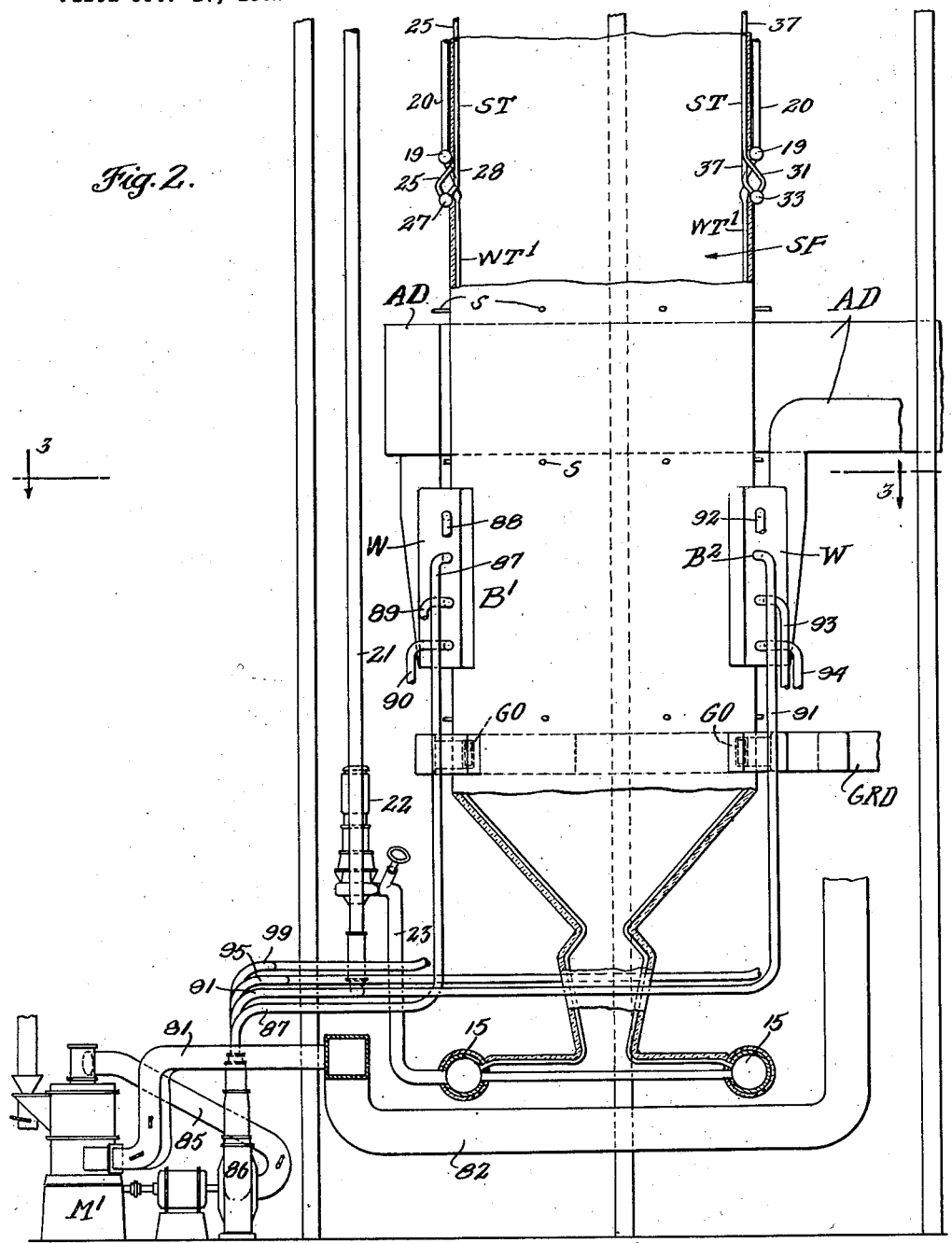
Figure 2 is an enlarged view of the lower portion of the superheater furnace portion, partly in elevation on the line 2—2 of Figure 3 and partly in section on the line 2a—2a of Figure 3.

The side walls of the superheater furnace portion SF are lined with water tubes WT (see Figure 3) and the lower portions of the front and rear walls are lined with water tubes $WT^1$ while the upper portions of these walls are lined with radiant superheater tubes ST (see Figure 1).

The water wall tubes WT and $WT^1$ are connected at their lower ends into lower water headers 15 as shown in Figure 1. The side wall tubes WT are connected at their upper ends into upper headers 16 which in turn are connected into a steam and water drum 17 by means of tubes 18. The water tubes $WT^1$ at the lower portion of the front and rear walls are connected at their upper ends into intermediate headers 19 which are connected into the steam and water drum 17 by upcomer tubes 20.

Water is led from the drum 17 to the lower headers 15 by means of downcomer tubes 21, circulating pumps 22 and connecting tubes 23 giving forced and controlled circulation, such as in the so-called "La Mont" type of boiler. Orifices in the tubes and/or headers (not shown) are provided for securing uniform distribution as is customary in said La Mont type of boiler. A feed water inlet connection 24 is provided for the drum 17 for delivering feed water thereto from a feed water pump means not shown, via the economizer E.

The superheater tubes ST located in the upper portion of the front and rear walls of the furnace constitute radiant superheater sections for the saturated steam delivered thereto from the drum 17. Alternate tubes 25 and 25' of the radiant section at the front wall (see Figures 1 and 2) are connected into the steam and water drum 17 as indicated at 26 (see Figure 1), so that saturated steam flows from the drum downwardly through these tubes into a lower header 27. From this header flow is upward through the remaining tubes 28 of the radiant section. The tubes 28 at their upper portions extend across the roof of the furnace as indicated at 29 in Figure 1, and connect into an upper header 30.

Alternate tubes 31 of the radiant superheater sections at the rear wall are connected (see Figures 2 and 1) into the steam and water drum 17 as indicated at 32, so that saturated steam flows from the drum through these tubes into a lower header 33. These tubes 31 in passing from the drum 17 to the header 33 first pass along the roof of the furnace, then along the roof of the outlet throat 34, then downwardly to form a screen at 35, then along the bottom of said throat, then under the nose 36 of the furnace and then downwardly for connection into the header 33. From this header alternate tubes 37 lead upwardly along the rear furnace wall, then under the nose 36, then upwardly to form a screen $37^1$ of spaced tubes across the entrance to the outlet throat 34 and finally connect into the header 30.

It will be seen therefore that the radiant superheater tubes in the front and rear wall of the furnace SF are in parallel with the drum 17 and discharge into the header 30.

Figure 6:
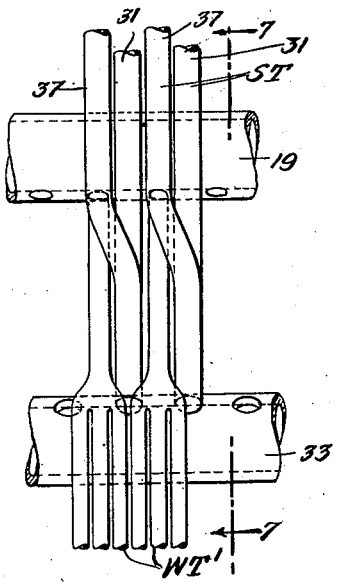
Figure 6 is an enlarged fragmentary elevation of a header and tube arrangement employed in the furnace walls.
Figure 7:
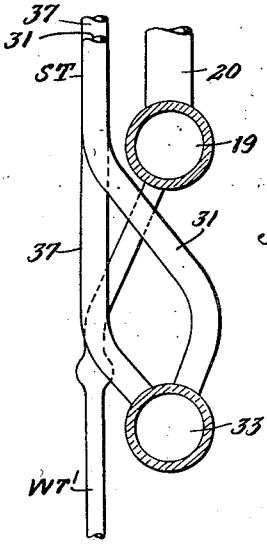
Figure 7 is a cross section on the line 7—7 of Figure 6.

By referring to Figures 6 and 7, it will be seen that the rear water wall tubes $WT^1$ are of trifurcated form at their upper ends for connection into the outside header 19 and that the downflow rear wall superheater tubes 31 and the alternate upflow superheater tubes 37 are bent to pass between the trifurcated water tubes for connection into the header 33. It will be seen from inspection of Figure 6 that this interspersed arrangement provides a substantially complete metal wall portion at that region, protecting the furnace setting. The same arrangement is provided for the front wall.

The steam and water drum 17 is supported from cross girders 38 by means of hangers diagrammatically indicated in Figure 1.

The front and rear water wall tubes are supported from the cross girders 38 at the top of the installation by hangers associated with the upcomer tubes 20 (see Figure 1). The side water wall tubes are suspended from the girders by means of hangers associated with the headers 16. The radiant superheater sections are also supported by hangers from the top cross girders. Thus expansion and contraction of the water walls and radiant superheater sections are independent of each other.

The reheater furnace portion RF in general is of the same construction as the superheater furnace SF in that it is likewise provided with water tubes WT lining the side walls connected at their lower ends into water headers 15 and at their upper ends into the steam and water drum 17, and with water tubes $WT^1$ lining the lower portions of the front and rear walls connected at their lower ends with water headers 15 and at their upper ends into headers 19 having upcomer connection with the steam and water drum 17 by means of upcomer tubes 20. The headers 15 are supplied by the downcomers 21, pumps 22 and connections 23 as before. Therefore it will be seen that the steam generating water wall tubes of furnaces SF and RF are in parallel insofar as their supply and delivery is concerned.

The upper portions of the front and rear walls of the reheater furnace portion RF are lined with radiant reheater tubes RT (see Figure 5) which constitute radiant reheater sections. The tubes 39 and 40 of these radiant sections are connected at their lower ends into headers 41 and 42 to which steam to be reheated is led from the end of the first stage of the turbine (not shown) by means of pipes 43.

Figure 5:
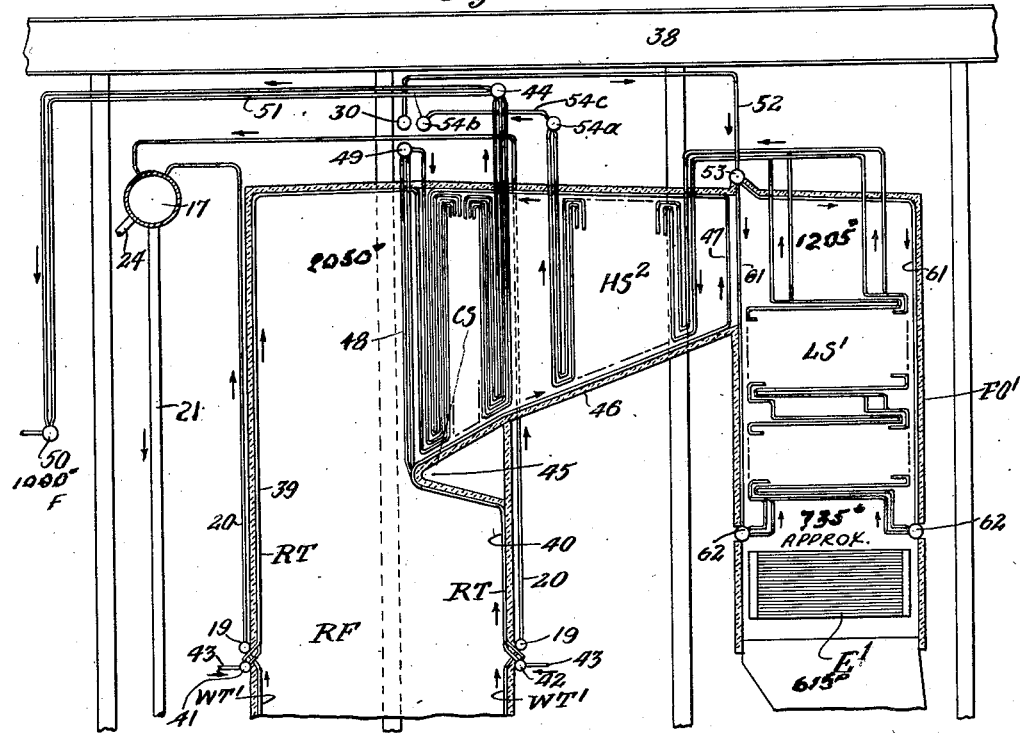
Figure 5 is a vertical section through the upper portion of the reheater portion of the furnace as indicated by the line 5—5 of Figure 4.

As best seen in Figure 5, the tubes 39 of the front wall radiant section at their upper ends extend across the roof of the furnace and then are grouped with the tubes of a high temperature convection reheater section CS and finally are connected into the top header 44 of the convection section CS.

Certain of the tubes 40 of the rear wall radiant section extend upwardly along the rear wall, then under the nose 45, and then some of the tubes extend along the bottom of the outlet throat 46 then upwardly across the outlet end of the throat to form a screen of spaced tubes at 47, then along the roof of the throat, then they are grouped with the tubes of the convection section CS and finally are connected into the header 44.

The remaining and alternate tubes 40 of the rear wall radiant section extend upwardly from the nose 45 across the front of the throat 46 to form a screen 48 of spaced tubes and then connect into an upper header 49.

Reheated steam is led from the header 44 to a suitably located reheat outlet header 50 by means of pipes 51. From the header 50, the reheated steam is led to the second stage of the turbine.

Reverting now to the superheater furnace portion (see Figures 1 and 15), high temperature finishing superheater section HS and intermediate superheater section $HS^1$ are located in the outlet throat 34 and a low temperature primary superheater section LS is located in the furnace outlet passage FO. An economizer section E is located in this passage following the superheater section LS.

The intermediate superheater section $HS^1$ constitutes one half of this high temperature superheating stage of the installation and the other half thereof $HS^2$ is located in the throat 46 of the reheat furnace RF.

The low temperature primary superheater section LS constitutes one half of the primary superheating stage of the installation and the other half thereof LS' is located in the offtake passage FO' of the reheat furnace RF.

The economizer section E constitutes one half of the economizer surface of the installation and the other half thereof E' is located in the offtake passage FO' of the reheat furnace RF.

The upper header 30 of the radiant superheater sections ST is connected by delivery pipes 52 to the upper header 53 of the low temperature primary superheater sections LS and the header 53 is connected to the lower headers 54 by downflow tubes 55. The tubes of the superheater section LS are connected into the headers 54 at their lower ends and at their upper ends they connect to the tubes of the high temperature superheater section $HS^1$. The high temperature superheater section $HS^1$ is connected for delivery to the high temperature superheater section HS by means of headers 54a and 54b and interconnecting tubes 54c. Pipes 56 lead from the upper header 57 of the superheader section HS to a superheater outlet header 58, from which the superheated steam is led to the first stage of the turbine by connection 58'.

Referring to Figures 5 and 15, steam is delivered to the tubes of the superheater section LS' from the upper header 53 by means of tubes 61 and lower heads 62, the header 53 receiving steam from the header 30 by means of the pipes 52. The upper ends of the tubes of this superheater section are connected to the tubes of the high temperature superheater section $HS^2$ which in turn are connected for delivery into the header 54b by means of header 54a and tubes 54c. As will be seen from Figures 1 and 15, the header 54b delivers steam to the tubes of the high temperature superheater HS of the superheater furnace SF.

Thus it will be seen that the finishing superheater elements are arranged in three groups, HS, HS' and $HS^2$, the section HS being located in the throat of the superheater furnace SF, serially followed insofar as gas flow is concerned, by the section HS' also located in the throat of the superheater furnace SF. The third section $HS^2$ is located in the throat of the reheater furnace RF, serially following insofar as gas flow is concerned, convection reheater section CS. It will also be seen that the primary superheater elements are arranged in two sections, LS and LS', the former being located in the throat of the superheater furnace serially following the section HS' insofar as gas flow is concerned and the section LS' being located in the throat of the reheater furnace serially following the section $HS^2$ insofar as gas flow is concerned. It will also be seen that the economizer elements are divided into two groups E and E', one section being located in the throat of the superheater furnace and the other in the throat of the reheater furnace, serially following the primary sections LS and LS' insofar as gas flow is concerned.

Referring to the block diagram of Figure 10, the arrangement of the heat absorbing surfaces and the passage of the gases is as follows. Gases leaving the superheater furnace SF first pass over the high temperature superheaters HS and $HS^1$, then over low temperature primary superheater LS and then over the economizer E.

Gases leaving the reheater furnace RF first pass over the reheater section CS, then over the high temperature superheater section $HS^2$, then over the low temperature superheater $LS^1$ and then over the economizer $E^1$.

As above pointed out, the high temperature superheater sections $HS^1$ of the superheater furnace and the high temperature superheater section $HS^2$ of the reheater furnace each constitute one half of this superheating stage of the installation, and the low temperature superheater LS of the superheater furnace and the low temperature superheater $LS^1$ of the reheater furnace each constitute one half of the primary superheating stage of the installation and the economizers E and $E^1$ of the two furnaces each constitute one half of the economizer surface. The two economizer sections are connected in parallel with the feed water pump (not shown) and both discharge into the steam and water drum 17.

At a point following the economizer sections E and $E^1$ a cross pressure balancing duct 64 connects the gas passages FO and $FO^1$ to enable cross flow of gases and balancing of pressure. The free areas of the two gas passages FO and $FO^1$ and the heating elements located therein are so proportioned that normally the gases leaving the furnaces will be of substantially the same weight and temperature, giving susbtantially equal draft loss.

Beyond the cross duct 64 the gases from the gas passages FO, $FO^1$ flow through air heaters 65, $65^1$, and then are cleaned by means of precipitators 66, $66^1$ and then are led by means of induced draft fans 67, $67^1$ to the stack 68. The air heaters and precipitators may be of any suitable type as is well known in this art, the Ljungstrom type of air heater being diagrammatically shown.

At a point between the economizer sections E and $E^1$ and the cross duct 64 proportioning dampers 69, $69^1$ are provided to compensate or correct for change in conditions which may occur in operation and which might affect relative temperature and draft losses, such, for example, as difference in surface cleanliness of the respective parts and the like. Gas shut off dampers 70—70, and 70'—70' are also provided at both sides of the air heaters, thus enabling cutting off of either gas passage when operation with only one heater is desired. Control dampers 71'—71' are also provided for the induced draft fans 67, 67' to equalize for possible differences in the condition of the air heaters.

Branch ducts $64^1$ and $64^2$ lead off from the cross duct 64 for connection with the gas recirculator ducts GRD and $GRD^1$. Fans are provided at $64^3$ and $64^4$ for recirculating the gases. Control dampers $64^5$ and $64^6$ are provided for the fans, to take care of possible inequalities and to make it possible to deliver recirculating gas to but one or other of the furnaces.

Referring now to the air introduction, air from the forced draft fans 72, 72' is led by means of ducts 73, 73' through the air heaters 65, 65', then through ducts 74, 74' to the pairs of ducts AD, AD and AD¹, AD¹, which lead to the wind boxes W of the burners, thus introducing hot secondary air into the furnaces with the fuel.

Cross air ducts 75 and 76 connect the ducts 73, 73' and 74, 74' for cross flow and pressure balancing. Shut-off and proportioning air dampers 77, 77' and 78, 78' are provided as shown in Figures 1 and 10, whereby air may be properly distributed to each furnace as required. In the event that one heater operation is desired either of the air heaters may be shut off by closing its shut-off dampers. Control dampers 79 and 80 are also provided for the forced draft fans 72, 72' to take care of any inequalities.

Heated air is led from the cross duct 76 to the air inlet ducts 81 of the four fuel pulverizing mills M¹, M², M³ and M⁴ of the superheater furnace SF by means of a duct 82 and to the four air inlet ducts 83 of the mills M⁵, M⁶, M⁷ and M⁸ of the reheater furnace RF by means of a duct 84 leading from the cross duct 76. Dampers for equalizing or shut off purposes are provided in the ducts 82 and 84. The fuel with primary air is fed from the mills to the burners by means of conduits 85 (see Figure 3) and exhausters 86, one exhauster being provided for each mill and each mill supplying the burners as will now be described.

Figure 11:
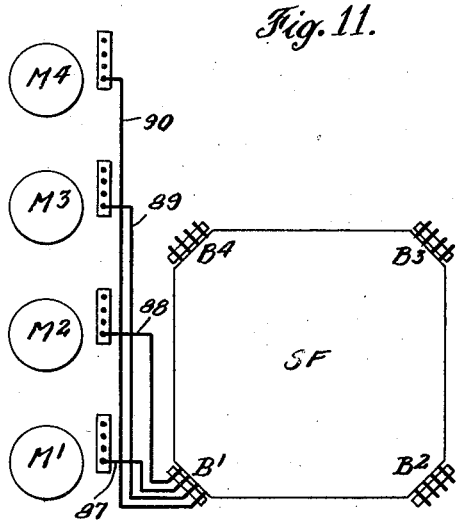
Figure 12:
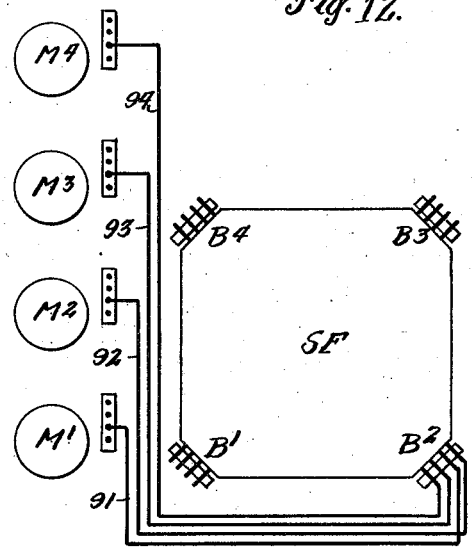
Figure 13:
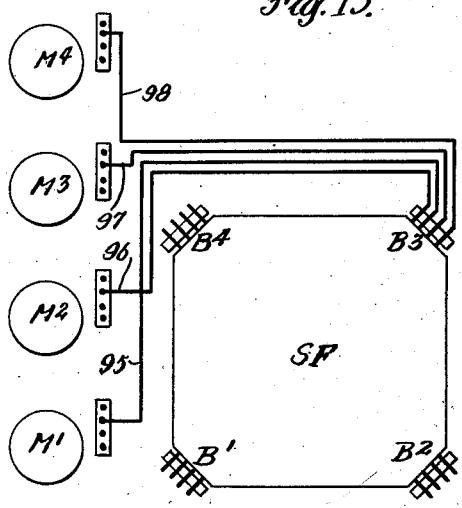
Figure 14:
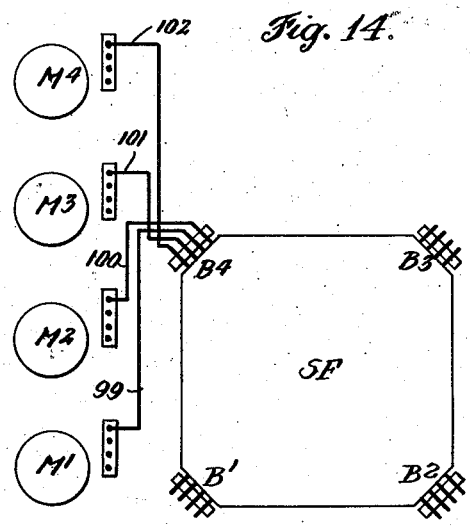

Referring now to Figures 2, 3 and 11 to 14 inclusive, it will be seen that the mill M¹ supplies one fuel nozzle of the corner burner B¹ by a pipe 87, that the mill M² supplies another fuel nozzle of the burner B¹ by a pipe 88, that the mill M³ supplies another fuel nozzle of the burner B¹ by a pipe 89, and that the mill M⁴ supplies the remaining fuel nozzle of the burner B¹ by a pipe 90, this being diagrammatically shown in Figure 11. Similarly the four nozzles of the burner B² are supplied by these four mills by pipes 91, 92, 93 and 94 (see Figure 12), the four nozzles of the burner B³ by pipes 95, 96, 97 and 98 (see Figure 13); and the four nozzles of the burner B⁴ by pipes 99, 100, 101, and 102 (see Figure 14).

The above pipe connections have been described as being those of the burners of the superheater furnace, but it is to be understood that the connections for the burners of the reheater furnace are the same as will be seen from inspection of Figure 3.

The burners are preferably of the tangential tilting type such as disclosed in the patent to Mittendorf, No. 2,575,885, issued November 23, 1951.

Figures 17, 18 and 19 diagrammatically represent the effect of adjusting the tilt of the burner nozzles on the flame. Tilting of the burners alters the extent to which gases are cooled by the water walls. Recirculation of gases also alters heat content absorbed by the walls.

Normally, each furnace will be supplied with fuel from three of its four respective mills, the fourth respective mill being a stand-by mill. Substantially equal amounts of fuel are delivered to each furnace, for which purpose any conventional type of common control (not shown) may be employed, such, for example, as steam pressure responsive devices which operate to control the fuel supply so as to maintain the desired steam pressure throughout the range of operations.

Referring now particularly to Figures 1, 3 and 4, it will be seen that the furnace elements are suspended from overhead girders 38, as stated before. By separating the furnace it is possible to support the girders not only from spaced rows of columns 103 and 104 at the outer sides of the furnace but also from an intermediate row of columns 105. Thus the span of the girders may be cut into approximately half insofar as support is concerned, which means that the girders which might otherwise have to be employed are greatly reduced in size, for example from 17 feet in depth of the web to approximately 6 feet in depth of the web—an enormous decrease in cost. Heavy load concentrations are also avoided, which also materially reduces construction costs. Similarly the buck stays required for the furnace proper and for the offtake, may be greatly reduced in size, with a proportionate decrease in cost. These buck stays are diagrammatically indicated at several points in the drawings, it being understood of course that they will be required also at other places. The arrangement also enables the use of radiant heat superheaters and reheaters and water walls at the adjacent inner side walls of the furnaces with outside headers such as described above for the front and rear walls with ready accessibility to the headers and tubes. Also accessories such as soot blowers diagrammatically indicated at S in Figures 1 and 2, can be employed in these walls with ready accessibility to the interiors of the furnace.

By separation of the furnace it is also possible to bring about a greater measure of simplification, symmetry and accessibility of the parts, such as the piping and ducts and the arrangement of the mills. The total amount of volume occupied is less than and the amount of evaporating surface is no greater than that which would be required in a single furnace installation of the same capacity and pressure.

Simplification results also from the fact that the two portions of the furnace can, for all practical purposes, be substantial counterparts. This tends toward economy. About the only difference that there is, is between the portions following the furnaces, where there is a small difference in the amount of heating surface incident to the difference between the characteristics of sperheating and of reheating. These differences are relatively so small that it is an easy matter to compensate therefor through the damper mechanism so that, for all practical purposes, there will be for any given rating, substantially the same weight of gases passing through the two portions at substantially the same temperature so that the draft losses through the tube portions will be substantially the same and there will be no mixture of gases of substantially different temperature. The passages and the various heat transfer surfaces are so constructed and proportioned as to give substantially uniform resistance to gas flow, which is advantageous not only in the above respects but also in connection with the maintenance of proper fuel-air ratio throughout the range of operation. (Metering devices forming part of the control mechanism customarily employed in this art operate most effectively under these conditions.)

By combining the separation of the furnace with controlled force circulation it is possible to further carry out the simplification with still further economy in that one is enabled to employ steam generating tubes of smaller diameter and to cut down the total volume of water. Thus, among other things, there is less metal and less water to heat, so that the installation may be brought into operation in a relatively much less shorter time than would otherwise be the case. In this connection it is also to be observed that it is not necessary for one to fire both portions of the furnace on starting. The superheater furnace may be first fired, thereby protecting the reheater furnace, and when this is done the reheater furnace is concurrently brought to temperature as soon as steam flow to the reheater is established, after which the reheater furnace is fired.

Simplicity and economy in construction is also facilitated by the provision of the tilting burners and by the provision for the recirculation of stack gases. The tangential firing tends to economy because it affords relatively long flame travel in furnace portions of relatively small volume, with relatively less evaporating surfaces. By the conjoint provision for control of superheat and reheat temperature it is possible to maintain constant the temperature of superheat and the temperature of reheat from maximum rating to as low as approximately 10% of rating, and this with a smaller amount of evaporating surface than would otherwise be required. Moreover, by this conjoint provision of independent and conjointly operable tilting burners and recirculation of gases, great flexibility is obtained. With a given amount of evaporating surface for a given maximum capacity at a given pressure and temperature, the tilting burners alone are inadequate except for relatively limited ranges of conditions, say down to approximately 30% of rating. This is also true with respect to the recirculation of gases. Thus for ratings from about 30% to approximately 10%, both may be used. Also for certain particular conditions either the tilting of the burners or the recirculation of gases is the better. By the provision of both with capability of conjoint or independent use, a very wide range of conditions can be met. By way of illustration, if recirculation of gases be continued below say 10% of rating, while there will be some drop in temperature of steam, it will nevertheless be possible to bottle up more heat in the turbine on banking so that it is possible to bring the installation back on the line in a relatively very short period of time—a matter of minutes rather than hours—without injury. Moreover, since the tilting of the burners for each furnace is independent of the tilting of the burners for the other furnace, and similarly with respect to the introduction of gaseous products of combustion, it is possible to make selective adjustments to meet all practical operating conditions. For example, the burners may be tilted in only one furnace, the gas may be recirculated in only one furnace, the burners may be tilted and the gas recirculated in only one furnace, or the burners tilted in one furnace and the gas recirculated in the other furnace, or the burners may be tilted in both furnaces and the gas recirculated in both furnaces and the like.

Insofar as efficiency of heat cycle is concerned, it will be seen that by making the two furnaces substantial counterparts and by the arrangement of the parts HS, CS, $HS^1$, $HS^2$, LS and $LS^1$ and E and $E^1$, in their respective locations, an exceedingly efficient heat cycle is obtained with approximately equal and substantially uniform amounts of heating surface, in consequence of which, under normal conditions, substantially equal weights of gas at substantially equal temperatures will exit to the air heaters. A minimum of the more expensive superheating and reheating surface is required.

A single steam and water drum will suffice.

The piping is simplified as contrasted with multiple, individual installations.

The mill connections are more symmetrical than would otherwise be the case, and control of the mills is simplified.

The fuel is burned efficiently in both furnaces, the installation, generally considered, is economical and simple as contrasted with other arrangements now in use for generating steam in comparable quantity and pressure and comparable temperatures of superheat and reheat.

The arrangement is also such that the gases leave the furnaces at temperatures such that conventional alloys may be used for the steam heating surfaces and such that slagging on the convection tubes is eliminated. The screens help in this respect. Typical temperatures are indicated in the drawings, the proportions of the surfaces, in the installation there shown, being calculated to approximate those temperatures at rating.

By separating the furnaces and separately conducting the gas streams for final mingling at the stack, it is possible to effectively use conventional control apparatus. This control apparatus, constituting no portion of the invention, is not illustrated.

The arrangement is also one which reduces the number of headers which need be employed and simplifies the piping.

By arranging the mills along one side, as shown in Figure 3, simplification of the bunkers and of the conveyor system is made possible.

In the modification shown in Figure 8, substantially all of the advantages hereinbefore described are obtained with the exception of the reduction in the size of the overhead supporting structure. In this modification the furnace is separated by providing a division water wall composed of water wall tubes 106 connected to receive water from the drum and to deliver steam thereto. Also the burners cannot be as simply arranged in this modification as in the preferred form of construction.

In Figure 9 a modified burner arrangement is illustrated in which the burner nozzles are arranged in two separately controllable, vertically spaced groups 107 and 108 and in which the recirculating gas inlet 109 is located in the space between the groups.

In Figure 16 a modified arrangement of the gas passages is illustrated in which the throat portions of the separated furnaces are formed as a single throat 34a following the convection superheater HS and convection reheater CS common to the two furnaces and this throat is connected to lead the gases into a single offtake passage $FO^2$ common to the two furnaces. In this instance the high temperature superheater $HS^3$ located in the throat 34a is in the form of a single unit extending for the full width of the throat and the low temperature primary superheater $LS^2$ extends for the full width of the offtake passage $FO^2$. An economizer, also of full width, is located below the superheater $LS^2$. Application of control mechanism is more complicated in this arrangement.

Steam is delivered from the single width header 30 of the superheater furnace SF to the double width header 53 by pipes 52 and from thence to the low temperature superheater $LS^2$ by pipes 55a, then to the high temperature superheater $HS^3$, then to the double width header 54a, then to the single width header 54b by pipes 54c, then to the high temperature finishing superheater HS of the superheater furnace SF, then to the header 57 and finally to the offtake header 58 from where it is led to the first stage of the turbine by pipes 58'.

The convection section CS of the reheater furnace RF is connected the same as above described in connection with Figure 5.

For convenience, we refer to the sections HS, $HS^1$ and $HS^2$, collectively as "finishing" superheater surfaces. They are finishing surfaces insofar as the primary superheating surfaces LS and $LS^1$ are concerned. While $HS^1$ and $HS^2$ are high temperature superheater surfaces as contrasted with the primary surfaces, they obviously operate at temperatures lower than that at which the surfaces HS operate. $HS^1$ and $HS^2$ are in reality intermediate or first stage finishing surfaces and HS, final finishing surfaces.

In the construction thus far described radiant steam heating surfaces are provided in both furnaces in advance of the throats thereof. Under certain conditions, as, for example, where the coal is of excellent quality having very high melting point ash content, it may be unnecessary to provide such radiant steam heating surface. In such case, in the superheater furnace saturated steam is led from the drum 17 directly to the headers 54 of the primary superheater sections, and steam from the turbine to be reheated is led directly to the reheater section CS. Such an arrangement is diagrammatically indicated in Figure 20. This construction is in general the same as that of Figure 16, with the exception that the sections SH and RH are of such dimension that the section $HS^3$ (of Figure 16) may be omitted. The primary superheater $LS^2$ in this case is followed by economizer surfaces, etc. as before. Desirably the surface of the superheater section SH is about 10% greater than the surface presented by the reheater section RH.

In the modification diagrammatically illustrated in Figure 21, a portion of the air preheating surfaces AH is located in advance of the economizer $E^1$, and the economizer is followed by a section of air preheating surfaces AH'. The advantage of this is that it is possible to increase the temperature of air preheat with relatively much less surface.

While in the preferred embodiment of the invention described the installation is divided into two parts, it will be understood that it may be divided into a still greater number of parts without departing from the spirit of the invention.

Also, while we have referred to the parts E and E' as economizers, it is to be understood that in lieu thereof evaporating boiler surfaces may be substituted in some instances, as equivalents.

While for generally normal operating conditions it is preferred to have equal weights of gases passing through the separated portions, it may sometimes be desirable to have unequal weights. By way of illustration, whereas the in temperature of steam to the superheater is generally always the same, and the temperature, in a temperature-load curve, is represented by a straight line parallel the base, the steam reheat curve is represented by a line rising somewhat from low to high load in such a curve. Therefore, there may be some conditions, particularly at very low loads, where it is desirable to have unequal weights of gas. This may be done, for example, by recirculating an appropriate amount of gaseous products of combustion through the reheater furnace or by changing the respective amounts of fuel delivered.

While we have shown the taking off of gases to be recirculated at a point beyond the economizer sections, the gas to be recirculated may alternatively be advantageously removed at a point between the economizer and the primary superheating sections. This reduces the power required for both free circulation and induced draft fans. This arrangement also reduces the amount of gas flow through the economizer portions, resulting in lower outlay gas temperature.

Referring now to Figure 5, if desired, the header 49 may be dispensed with and the tubes 48 nested with the tubes of the section CS, to deliver ultimately to header 44. Similarly header 57 of Figure 1 may be dispensed with and the tubes of section HS run directly to the header 58.

It will be understood that where the radiant superheater and the radiant reheater surfaces are not employed they are to be replaced by evaporating surfaces. The radiant superheater and reheater surfaces are advantageous to take care of otherwise high temperature conditions and of low grade fuels where low furnace outlet temperatures are desirable. Through the use of such radiant heat surfaces in desired amounts and locations, higher steam and reheat temperatures are obtainable and the cost is lower because of the reduction in the amount of superheater and reheater surfaces which would otherwise be required.

What we claim is:

A reheat cycle boiler installation having a single controlled water circulation system for generating and heating steam comprising physically separated first and second furnaces; first and second steam generating sections disposed respectively in said first and second furnaces in parallel fluid flow relation and having tubular water wall linings adapted to be subject to radiant heat; means for forceably circulating water through said steam generating sections; means for firing fuel into each of said sections to produce a first and a second stream of gas respectively in each, first and second gas passages opening respectively from said sections; a superheater adapted to be subject to radiant heat and to receive primary steam from said steam generating sections and disposed in heat exchange relationship only to said first stream; a reheater adapted to be subject to radiant heat and to receive secondary or reheat steam and disposed in heat exchange relationship only to said second stream; additional means for absorbing heat from the said gases including an additional superheater comprising intermediate and finishing portions, said finishing portion disposed in said first passage ahead of said intermediate portion in the gas flow sense and absorbing heat only from said first gas stream, the steam inlet of said intermediate portion operatively connected to the steam outlet of said radiant superheater; said intermediate portion comprising at least two parallel flow paths of the fluid being heated, one in said first gas passage and exposed to said first gas stream, and the other in said second gas passage and exposed to said second gas stream, the steam inlet of said superheater finishing portion connected to the steam outlet of said intermediate portion; first control means for altering the heat content of the gas stream reaching the superheater by varying the heat absorbed from said stream by the water wall linings of said first steam generating section, while maintaining constant steam generating load; second control means for altering the heat content of the gas stream reaching the reheater by varying the heat absorbed from said second stream by the water wall linings of said second steam generating section, while maintaining constant steam generating load; and control means for varying the rate at which fuel is fired into said two sections.

References Cited in the file of this patent

UNITED STATES PATENTS

| | | |
|---|---|---|
| 1,835,309 | Kemnal | Dec. 8, 1931 |
| 1,931,948 | Armacost | Oct. 24, 1933 |
| 1,964,149 | Frisch | June 26, 1934 |
| 2,053,429 | Gordon | Sept. 8, 1936 |
| 2,213,185 | Armacost | Sept. 3, 1940 |
| 2,245,209 | Mayo | June 10, 1941 |
| 2,285,442 | Kerr | June 9, 1942 |
| 2,330,240 | Raynor | Sept. 28, 1943 |
| 2,420,647 | Boland | May 20, 1947 |
| 2,424,476 | Marshall | July 22, 1947 |
| 2,512,677 | Raynor | June 27, 1950 |
| 2,579,027 | Walter et al. | Dec. 18, 1951 |
| 2,590,712 | Lacerenza | Mar. 25, 1952 |
| 2,673,553 | Rowand et al. | Mar. 30, 1954 |

FOREIGN PATENTS

| | | |
|---|---|---|
| 523,871 | Great Britain | July 24, 1940 |